Oct. 12, 1937.  R. S. WHITTINGTON  2,095,779
AUTOMATIC CLUTCH CONTROL DEVICE
Filed Sept. 9, 1932
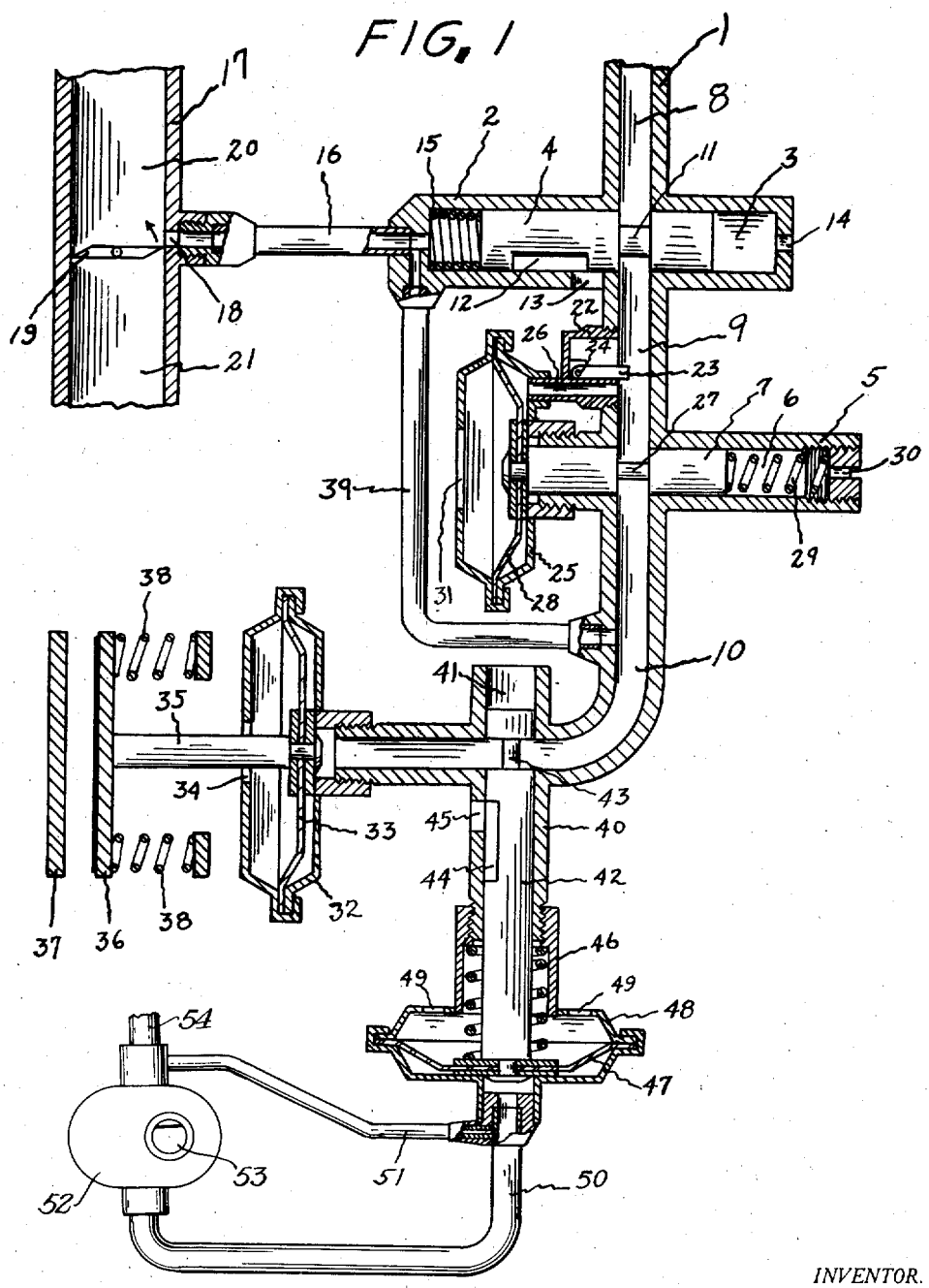
INVENTOR.
BY Ralph S. Whittington
ATTORNEY.

Patented Oct. 12, 1937

2,095,779

UNITED STATES PATENT OFFICE 2,095,779

AUTOMATIC CLUTCH CONTROL DEVICE

Ralph S. Whittington, Oak Park, Ill., assignor to Bendix Products Corporation, South Bend, Ind., a corporation of Indiana Application September 9, 1932, Serial No. 632,295

14 Claims. (Cl. 192—.01)

This invention relates to an automatic control means for use in actuating the clutch of an automotive vehicle, or the like.

One of the primary objects of this invention is to provide a control means for the clutch of a motor vehicle, which depends in its action, on the acceleration of the motor of the vehicle, and also on the motion of the vehicle.

A further object of this invention is to provide a control means of the above mentioned character which is simple in design, having the minimum number of parts, and one requiring the minimum adjustment after being installed on the vehicle.

To this end the invention provides a method of arresting the motion of the clutch plates toward engagement at the initial engagement of the clutch plates. Thus when the clutch plates wear, no adjustment is required to secure the proper clutch engagement.

Numerous other objects and advantages will become apparent as the following description proceeds, particularly when reference is had to the drawing.

Fig. 1 is a semi-diagrammatic view partly in section of a control means constructed in accordance with this invention.

In general this invention relates to an automatic control means for the clutch of an automotive vehicle which releases the clutch automatically when the motor idles by the use of intake manifold vacuum and engages the clutch when the acceleration control mechanism of the vehicle is actuated. The actuation of the clutch, however, is further dependent on the motion of the vehicle, the system being arranged to prevent the release of the clutch while the vehicle is in motion, or moving above a predetermined velocity. This eliminates the feature of free wheeling used in prior clutch control devices, and makes the system particularly adapted to a motor vehicle in which free wheeling is not desirable, which is the case of vehicles equipped with certain types of infinite gear ratio transmissions now being developed.

For the above purpose this invention provides a valve operative by the motion, or conditions accompanying the motion, of the vehicle to render the automatic control means inoperative after the vehicle has attained a certain minimum speed. The above valve can be operated by pressure from the transmission lubricating pump, where the vehicle is provided with such, or any pressure generated by the motion of the vehicle.

In prior devices of this nature it has been necessary to have the pressure responsive member actuating the check valve that arrests the motion of the clutch toward engagement in communication at all times with the main pressure responsive member that releases the clutch. Thus an additional passage is required to allow this check valve to be opened on the release of the accelerator, or an individual passage must be provided to admit atmosphere to engage the clutch.

In this invention the check valve referred to above is not operated by the vacuum in the main clutch operating member, but is operated by a local vacuum created by the velocity of gas passing to the main clutch operating member as the clutch moves toward engagement, and by intake manifold vacuum.

This invention also provides for the operation of the main valve, controlling communication between the clutch operating member and the intake system and the above member and the atmosphere, as well as the suction and atmospheric bleed controlling the final engagement of the clutch, thru a single connection to the carburetor riser adjacent to the throttle valve.

Referring then to the drawing, there is shown in Fig. 1 a system composed of the conduit 1, which is adapted to be connected to the intake system of the motor (not shown) of the vehicle with which the system is associated. The conduit 1 is provided with the lateral extension 2 which contains the bore 3, which slidably receives the valve 4. The extension 5 on the conduit 1 contains the bore 6 which slidably receives the check valve 7. Conduit 1 is divided into the passages 8, 9, and 10 by the valves 4 and 7.

The valve 4 controls communication between passage 8 and 9, and between passage 9 and the atmosphere, by virtue of the reduced portion 11 of valve 4 and the cut away portion 12 of valve 4 which registers with the port 13 in extension 2. Bore 3 communicates with the atmosphere thru the port 14. Valve 4 is actuated by spring 15 and by vacuum from the conduit 16, which is tapped into the carburetor riser 17 at the port 18. Carburetor throttle valve 19 divides the riser 17 into passage 20, adapted to be connected to the intake manifold (not shown), and passage 21, adapted to be connected to the carburetor (not shown).

Tapped into the passage 9 is the member 22 containing the pivoted valve 23 which pivots at 24. Member 22 provides communication between diaphragm casing 25 and passage 9 thru the passage 26 at a point directly under pivoted valve 23, which normally has the position shown in Fig. 1 due to its weight. Check valve 7 is provided with the reduced portion 27 to allow communication between passages 9 and 10. Check valve 7 is actuated by diaphragm 28 and spring 29. Bore 6 is open to the atmosphere thru port 30, and diaphragm 28 is exposed to atmosphere thru port 31.

Conduit 1 ends in diaphragm casing 32, and diaphragm 33 is responsive to pressure in passage 10, while the plunger 42 is in the position shown in Fig. 1, and to atmospheric pressure thru the port 34. Pull rod 35 operated by diaphragm 33 moves the clutch plate 36 away from the clutch plate 37 against the action of the clutch springs 38.

Tapped into the extension 2 and communicating with the conduit 16, is the conduit 39, which communicates with passage 10.

The conduit 1 is further provided with the extension 40 which contains the bore 41 which slidably receives the plunger 42. Plunger 42 controls communication between passage 10 and diaphragm 33, and between diaphragm 33 and the atmosphere by virtue of the reduced portion 43 of plunger 42, the groove 44 of plunger 42, and port 45 of extension 40. Tapped onto the extension 40 is the diaphragm casing 48. Plunger 42 is actuated by spring 46 and by diaphragm 47 mounted in the diaphragm casing 48. Diaphragm 47 is exposed to atmospheric pressure thru the ports 49, and to pressure in conduit 50 which is adapted to be connected to a source of pressure generated by the motion of the vehicle. The conduit 51 provides a passage from the interior of conduit 50, and is adapted to be connected to the reservoir or intake of the means supplying pressure thru the conduit 50.

In the operation of the system, as soon as the motor is started, vacuum is created in passage 20 and acts thru port 18 and conduit 16 on the exposed surface of valve 4, allowing atmospheric pressure acting thru port 14 to overcome spring 15 and move valve 4 to the position shown in Fig. 1. Then by virtue of the reduced portion 11 of the valve 4, vacuum from the intake manifold, acting in passage 8, passes to passage 9 where it acts thru passage 26 and on the diaphragm 28. This allows atmospheric pressure to act thru port 31 to overcome spring 29 and hold valve 7 in the position shown in Fig. 1. Vacuum then acts past valve 7 to the passage 10 by virtue of the reduced portion 27 of the check valve 7. The vacuum in passage 10 allows atmospheric pressure acting thru port 34 to overcome the clutch springs 38 and release the clutch.

While the clutch is being released, pivoted valve 23 rotates upward, and causes no restriction to the motion of air in passage 9.

As soon, however, as the carburetor valve 19 is rotated to accelerate the motor, throttle valve 19 begins to reduce the area of port 18 exposed to vacuum, and increase the area of port 18 exposed to near atmospheric pressure in passage 21. This produces a drop in vacuum in the conduit 16 which is transferred to the valve 4. Both by the strength of spring 15, and by the location, size, and shape of the port 18, the spring 15 is allowed to move valve 4 to shut off vacuum from the intake manifold, and expose passage 9 to atmospheric pressure thru port 13 and cut away portion 12 of valve 4, and thus start the clutch engagement at the proper time in relation to the motor speed.

The pivoted valve 23 normally has the position shown in Fig. 1 due to its weight. As air passes thru passage 9, a local vacuum is set up by the velocity of the air and the accompanying eddy currents, directly under the pivoted valve 23. This vacuum induced by velocity of air in passage 9 is transferred thru passage 26 to diaphragm 28, thus holding the valve 7 open while the clutch plates move toward engagement. As soon, however, as the clutch plates begin engagement, there will be a drop in velocity of air in the passage 9, which will cause a decrease in the local vacuum acting thru the passage 26. Adjustable spring 29 is set to move check valve 7 to close passage 9 from passage 10 at the proper change in velocity in the passage 9 to secure the proper clutch contact. The above local vacuum need only be very small in magnitude, as the area of diaphragm 28 can be made large enough to apply a substantial force to move the check valve 7.

Conduit 39 communicates with port 18 in the carburetor riser, and the pressure in this conduit depends on the position of the carburetor throttle valve 19, decreasing as the throttle valve opens. Therefore more atmosphere will be admitted to the diaphragm casing 32 to complete the clutch engagement as the throttle valve 19 is opened.

By the proper selection of spring 15, the proper location, size, and shape of port 18 and other related parts, sufficient vacuum can be prevented from existing in conduit 39 to completely release the clutch while the valve 4 is closed.

It is obvious that conduits 39 and 16 could be tapped into the carburetor riser 17 at individual ports, and thereby give greater control over the pressure in these conduits with relation to the speed of the motor.

The above described operation takes place at the initial starting of the vehicle, and is not affected by the plunger 42, which is actuated by the spring 46, while the vehicle is stationary or moving below a predetermined minimum speed, to provide communication between passage 10 and diaphragm 33 by virtue of the reduced portion 43 of plunger 42. The plunger 42 is also actuated by the diaphragm 47, and diaphragm 47 is actuated by pressure applied thru the conduit 50. Conduit 50 is adapted to be connected to some source of pressure generated by the motion of the vehicle, preferably the transmission lubricating pump 52 which is driven by the shaft 53 which is adapted to be connected to the transmission of the vehicle in such a manner that the pump 52 must operate at all times that the propeller shaft of the vehicle is rotating. The conduit 54 connects the inlet of pump 52 to the oil level of the transmission.

Thus after the clutch engages and the vehicle attains some predetermined speed, the pressure in conduit 50 will overcome spring 46 and move plunger 42 to close passage 10 from diaphragm 33 and open diaphragm 33 to the atmosphere by virtue of port 45 in extension 40, and the groove 44 in the plunger 42. The speed of the vehicle at which the above action occurs can be controlled by controlling the pressure developed in conduit 50 as the speed of the vehicle increases, and by the strength of spring 46 with relation to the area of diaphragm 47.

Thus the automatic clutch operating device is rendered inoperative after the vehicle attains some predetermined speed, and the closing of the throttle valve will not release the clutch until the speed of the vehicle has been reduced to some predetermined value, which can be controlled as pointed out above and also by the capacity of the pressure relief passage thru the conduit 51, provided for the removal of the fluid displaced by diaphragm 47 as the spring 46 actuates the plunger 42 to open diaphragm 33 to passage 10. Conduit 51 is adapted to be connected to the reservoir or the intake of the pump supplying pressure thru the conduit 50.

The above relief passage may also be provided at the discharge of the pump or device supplying pressure to the conduit 50. The relief passage can be made small enough in capacity not to interfere with the pressure source in maintaining a pressure in the conduit 50, and at the same time provide for the movement of fluid from the diaphragm casing 48 by the pressure of spring 46.

Obviously the plunger 42 can be adapted to perform the above function in any control system using a pressure responsive member actuated by vacuum or pressure from any source.

While the invention has been described with some detail, it is to be understood that the description is for the purpose of illustration only, and is not to be construed as definitive of the limits of the inventive idea. The right is reserved to make such changes in the details of construction and arrangement of parts as will fall within the purview of the following claims.

What I claim as my invention is:

1. In an automatic control for the clutch of a motor vehicle, the combination with a throttle for controlling the acceleration of the motor, of a pressure responsive means for releasing the clutch, means providing a passage between the pressure responsive means and the intake system of the motor, means operating when the throttle is closed to open said passage whereby vacuum from said intake system actuates said pressure responsive means to release the clutch, means operating upon the actuation of said acceleration control means to reduce the vacuum acting on said pressure responsive means whereby said clutch is moved toward engaged position, means, controlled by the velocity of air passing through said second mentioned means, for permitting a relatively fast movement of the clutch toward engaged position and automatically operating to retard said movement when the clutch initially engages, together with other means controlling the pressure acting on said pressure responsive means whereby the engagement of said clutch is completed.

2. In an automatic control for the clutch of a motor vehicle, the combination with a throttle for controlling the acceleration of the motor, of a pressure responsive means for releasing the clutch, means providing a passage between the pressure responsive means and the intake system of the throttle, means operating when the throttle is closed to open said passage whereby vacuum from said intake system actuates said pressure responsive means to release said clutch, means operating upon the actuation of said acceleration control means to reduce the vacuum acting on said pressure responsive means whereby said clutch is moved toward engaged position, means responsive to the velocity of gas allowing said clutch to move toward engaged position and operating to retard the motion of said clutch toward engagement at the change in gas velocity incident to the partial engagement of said clutch, and means operative on the actuation of said acceleration control mechanism to control the pressure acting on said pressure responsive means whereby the engagement of said clutch is completed.

3. In an automatic control means for the clutch of a motor vehicle, the combination with a throttle valve for controlling the accelerating of the motor, of means providing a passage to the intake system of the motor, a member responsive to vacuum in said passage for releasing the clutch, a main valve in said passage operable to control communication between said member and the atmosphere and between said passage and the intake system of the motor, an auxiliary valve operable to control communication between said member and the atmosphere, pressure differential operated means for operating said auxiliary valve, means operating upon the actuation of said throttle to actuate said main valve to close said passage from the intake system and open said passage to the atmosphere whereby said clutch is moved toward engaged position, a pivoted projection in the passage between the atmosphere and said member, said pivoted projection creating a local vacuum as said clutch moves toward engagement and creating no restriction as said clutch is released, a secondary passage whereby said local vacuum actuates said pressure differential operated means to expose said member to atmosphere, resilient means operative to close said auxiliary valve at the change in velocity of air incident to the partial engagement of said clutch, and means operating to control the pressure acting on said member whereby the engagement of said clutch is completed.

4. In an automatic control means for the clutch of a motor vehicle, the combination with a throttle for controlling the acceleration of the motor, of a pressure responsive member for releasing the clutch, means providing a passage between the intake system of the throttle and said member, means operating when the throttle is closed and when the speed of said vehicle is below a predetermined point to open said passage whereby vacuum actuates said member to release said clutch, means operating upon the actuation of said acceleration control mechanism to reduce the vacuum acting on said member whereby said clutch is moved to engaged position, and means responsive to the motion of said vehicle to close said passage from the intake system and open said passage to the atmosphere when said vehicle attains a predetermined velocity whereby said automatic control means is rendered inoperative.

5. In an automatic control means for the clutch of a motor vehicle, the combination with a throttle for controlling the acceleration of the motor, of a pressure responsive member for releasing the clutch, means providing a passage between the intake system of the motor and said member, means operating when the throttle is closed and when the speed of said vehicle is below a predetermined point to open said passage whereby vacuum actuates said member to release said clutch, means operating upon the actuation of said acceleration control mechanism to reduce the vacuum acting on said member whereby said clutch is moved to engaged position, and means responsive to the motion of said vehicle to close said pressure responsive member from vacuum and expose said pressure responsive member to atmosphere when said vehicle attains a predetermined velocity.

6. In an automatic control means for the clutch of a motor vehicle, the combination with a throttle for controlling the acceleration of the motor, of a pressure responsive member for releasing the clutch, means providing a passage between the intake system of the motor and said member, means operating when the throttle is closed and when the speed of said vehicle is below a predetermined point to open said passage whereby vacuum actuates said member to release said clutch, means operating upon the actuation of said acceleration control mechanism to reduce the vacuum acting on said member whereby said clutch is moved to engaged position, and means responsive to pressure generated by the motion of said vehicle to close said member from vacuum in said intake system and expose said member to atmosphere when said vehicle attains a predetermined speed.

7. In an automatic control means for the clutch of a motor vehicle, the combination with a throttle for controlling the acceleration of the motor and the transmission lubricating pump of the vehicle of a pressure responsive member for releasing the clutch, means providing a passage between the intake system of the motor and said member, means when the throttle is closed and when the speed of said vehicle is below a predetermined point to open said passage whereby vacuum actuates said member to release the clutch, means operating upon the actuation of said acceleration control mechanism to reduce the vacuum acting on said member whereby clutch is moved to engaged position, and means responsive to pressure generated by the transmission lubricating pump of the vehicle to close said member from vacuum in the intake system and open said member to atmosphere when said vehicle attains a predetermined speed.

8. In an automatic control means for the clutch of a motor vehicle, the combination with a throttle for controlling the acceleration of the motor and the transmission lubricating pump of the vehicle, of a pressure responsive means for releasing the clutch, means providing a passage between the intake system of the motor and said pressure responsive means, means when the throttle is closed and when the speed of said vehicle is below a predetermined point to open said passage whereby vacuum actuates said pressure responsive means to release said clutch, means operating upon the actuation of said acceleration control mechanism to reduce the vacuum acting on said pressure responsive means whereby said clutch is moved to engaged position, means responsive to pressure generated by said transmission lubricating pump to close said pressure responsive means from the intake system and expose said pressure responsive means to atmospheric pressure when said vehicle attains a predetermined speed, and means relieving the pressure from said transmission lubricating pump whereby said means responsive to said pump pressure returns to normal position as said vehicle stops.

9. In an automatic control means for the clutch of a motor vehicle, the combination with a throttle for controlling the acceleration of the motor and a pump driven by the motion of said vehicle, of a pressure responsive member for releasing the clutch, means providing a passage between the intake system of the motor and said member, means when the throttle is closed and when the speed of said vehicle is below a predetermined point to open said passage whereby vacuum actuates said member to release said clutch, means operating upon the actuation of said acceleration control means to reduce the vacuum acting on said member whereby said clutch is moved to engaged position, a valve in said passage operative by pressure developed by said pump and by a resilient means, said resilient means operating to hold said valve open whereby vacuum can actuate said member, means allowing pressure developed by said pump when said vehicle attains motion to actuate said valve to close said passage from the intake system and open said passage to atmosphere whereby said automatic control means is rendered inoperative, and means providing for the exit of the fluid displaced by the return motion of said valve whereby said resilient means is allowed to actuate said valve.

10. In an automatic control means for the clutch of a motor vehicle, the combination with a throttle for controlling the acceleration of the motor and a pump driven by the motion of the vehicle, of a pressure responsive member for releasing the clutch, means providing a passage between the intake system of the motor and said member, means operating when the throttle is closed and when the speed of said vehicle is below a predetermined point to open said passage whereby vacuum actuates said member to release said clutch, means operating upon the actuation of said acceleration control mechanism to reduce the vacuum acting on said member whereby said clutch is moved toward engaged position, an auxiliary valve operable to control communication between said member and the atmosphere, means responsive to the velocity of air allowing said clutch to move toward engaged position to close said auxiliary valve at the initial contact of said clutch, means operating upon the actuation of said acceleration control mechanism to further reduce the vacuum acting on said member whereby the engagement of said clutch is completed, means responsive to the pressure generated by said pump to close said passage from the intake system and open said passage to the atmosphere whereby said automatic control means is rendered inoperative, and means providing for the exit of fluid displaced by the return motion of said means responsive to the pressure of said pump whereby said means responsive to pressure from said pump is allowed to assume its normal position as the speed of said vehicle decreases below a predetermined point.

11. In an automatic control means for the clutch of a motor vehicle, the combination with a throttle for controlling the acceleration of the motor, of a pressure responsive means for releasing the clutch, means providing a passage between the pressure responsive means and the intake system of the motor, means operating when said throttle is closed to open said passage whereby vacuum from said intake system actuates said pressure responsive means to release the clutch, means operating upon the actuation of said acceleration control means to reduce the vacuum acting on said pressure responsive means whereby said clutch is moved toward engaged position, means responsive to the velocity of air passing through said passage, for causing said clutch to move toward engaged position and operating to retard the motion of said clutch toward engagement at a substantial change in the velocity of air passing through said passage, and means for effecting partial clutch engagement and maintaining the same until further actuation of said acceleration control means is accomplished.

12. In a clutch control mechanism for an automotive vehicle provided with an intake manifold, a pressure differential operated motor, a fluid transmitting connection interconnecting the manifold and motor, control valve means for said motor incorporated in said fluid transmitting connection, and means, controlled by the velocity of the fluid passing through said connection, for controlling the operation of said valve.

13. In a clutch control mechanism for an automotive vehicle provided with a propeller shaft, a pressure differential operated motor having a fluid transmitting connection with a source of fluid pressure, a cut-off valve for controlling the passage of fluid through said connection, and means, operated solely by said propeller shaft, for operating said cut-off valve.

14. Clutch control mechanism for an automotive vehicle, said vehicle including an internal-combustion engine provided with a riser interconnecting the intake manifold and the carburetor of the engine, said riser housing a butterfly or throttle valve, said mechanism comprising a pressure differential operated motor, a fluid transmitting connection interconnecting said motor and riser, the junction between said connection and riser being opposite said throttle valve and so positioned as to make of the valve a control member for said motor to regulate the gaseous pressure thereof in accordance with the pressure on opposite sides of the throttle valve, together with other means for controlling the gaseous pressure of said motor, including other fluid transmitting means, the gaseous pressure within said latter means being controlled by the aforementioned valve.

RALPH S. WHITTINGTON.

CERTIFICATE OF CORRECTION.

Patent No. 2,095,779.                 October 12, 1937.

RALPH S. WHITTINGTON.

It is hereby certified that error appears in the printed specification of the above numbered patent requiring correction as follows: Page 3, first column, line 61, claim 2, for the word "throttle" first occurrence, read motor; and second column, line 41, claim 4, for "throttle" read motor; and that the said Letters Patent should be read with these corrections therein that the same may conform to the record of the case in the Patent Office.

Signed and sealed this 3d day of May, A. D. 1938.

(Seal)                                             Henry Van Arsdale,
                                                     Acting Commissioner of Patents.

tomotive vehicle provided with an intake manifold, a pressure differential operated motor, a fluid transmitting connection interconnecting the manifold and motor, control valve means for said motor incorporated in said fluid transmitting connection, and means, controlled by the velocity of the fluid passing through said connection, for controlling the operation of said valve.

13. In a clutch control mechanism for an automotive vehicle provided with a propeller shaft, a pressure differential operated motor having a fluid transmitting connection with a source of fluid pressure, a cut-off valve for controlling the passage of fluid through said connection, and means, operated solely by said propeller shaft, for operating said cut-off valve.

14. Clutch control mechanism for an automotive vehicle, said vehicle including an internal-combustion engine provided with a riser interconnecting the intake manifold and the carburetor of the engine, said riser housing a butterfly or throttle valve, said mechanism comprising a pressure differential operated motor, a fluid transmitting connection interconnecting said motor and riser, the junction between said connection and riser being opposite said throttle valve and so positioned as to make of the valve a control member for said motor to regulate the gaseous pressure thereof in accordance with the pressure on opposite sides of the throttle valve, together with other means for controlling the gaseous pressure of said motor, including other fluid transmitting means, the gaseous pressure within said latter means being controlled by the aforementioned valve.

RALPH S. WHITTINGTON.

CERTIFICATE OF CORRECTION.

Patent No. 2,095,779. October 12, 1937.

RALPH S. WHITTINGTON.

It is hereby certified that error appears in the printed specification of the above numbered patent requiring correction as follows: Page 3, first column, line 61, claim 2, for the word "throttle" first occurrence, read motor; and second column, line 41, claim 4, for "throttle" read motor; and that the said Letters Patent should be read with these corrections therein that the same may conform to the record of the case in the Patent Office.

Signed and sealed this 3d day of May, A. D. 1938.

(Seal)

Henry Van Arsdale,
Acting Commissioner of Patents.

CERTIFICATE OF CORRECTION.

Patent No. 2,095,779.　　　　　　　　　　　　October 12, 1937.

RALPH S. WHITTINGTON.

It is hereby certified that error appears in the printed specification of the above numbered patent requiring correction as follows: Page 3, first column, line 61, claim 2, for the word "throttle" first occurrence, read motor; and second column, line 41, claim 4, for "throttle" read motor; and that the said Letters Patent should be read with these corrections therein that the same may conform to the record of the case in the Patent Office.

Signed and sealed this 3d day of May, A. D. 1938.

(Seal)
　　　　　　　　　　　　　　　　　　　　　　Henry Van Arsdale,
　　　　　　　　　　　　　　　　　　Acting Commissioner of Patents.